Patented Dec. 14, 1948

2,456,428

UNITED STATES PATENT OFFICE 2,456,428

POLYALLYL AMINE AND RELATED POLYMERIC AMINES

James H. Parker, Berkeley, Calif., assignor to Shell Development Company, San Francisco, Calif., a corporation of Delaware No Drawing. Application October 11, 1944, Serial No. 558,282

8 Claims. (Cl. 260—80)

This invention relates to a new class of polymeric amines and to a method for their manufacture. More particularly, the invention pertains to polyallyl amine and related polymers.

Various allyl compounds containing one or more allyl radicals in the molecules thereof have been successfully polymerized heretofore. For example, Adelson and Dannenberg in copending application, Serial No. 417,278, filed October 31, 1941, now abandoned, described the polymerization of allyl acetate to polyallyl acetate by heating the ester at 65° C. in the presence of benzoyl peroxide or by heating the ester at 125° C. to 130° C., while bubbling air therethrough in order to catalyze the polymerization. Such treatment produces an appreciable polymerization of the allyl ester. Thus, allyl esters, in a similar manner to vinyl esters like vinyl acetate, can be polymerized although the allyl esters are more resistant to the formation of polymer and require considerably more severe conditions to effect the polymerization than is the case with vinyl esters.

Allyl amines or derivatives thereof are not polymerized by even the severe conditions suitable for polymerization of allyl esters. When diallyl amine (allyl secondary amine) is heated at 130° C. while bubbling air therethrough, the material merely turns dark in color and no polymer forms even though the treatment is continued for prolonged times. Triallyl amine and trimethallyl amine when treated in the same manner also do not polymerize. Thus, these allyl and methallyl amines, even though they contain a plurality of allyl or methallyl radicals which makes them more susceptible to forming polymers, are resistant to polymerization. Similarly N, N-diallyl acetamide (which is analogous to allyl acetate and is made by reacting diallyl amine with acetylchloride) shows no evidence of polymerizing when heated at 65° C. in the presence of 5% benzoyl peroxide. It is accordingly seen that compounds containing the polymerizable allyl group which is linked to an amino nitrogen atom are resistant to formation of polymers apparently owing to the inhibiting action of the amino nitrogen contained in the compounds. However, polyallyl amine and related polymeric amines are highly useful materials but they cannot be obtained by direct polymerization of the monomeric unsaturated amines.

According to the present invention, polyallyl amine and related polymeric amines of the invention are obtained by an indirect method wherein polyacrylonitrile and related polymeric nitriles are hydrogenated to the corresponding amines. In the particular case of obtaining polyallyl amine from polyacrylonitrile the reaction involved in the process is illustrated by the following equation wherein $n$ is an integer of at least four.

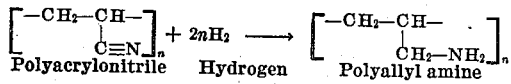

While the present invention is primarily concerned with polyallyl amine and its production, other related polymeric amines are also a part of the invention. These related polymeric amines are obtained by hydrogenating appropriate polymeric nitriles. Thus, for example, there can be used as starting materials, polymethacrylonitrile, polyethacrylonitrile, polycrotylonitrile, polycinnamylonitrile, and the like. In general, the starting materials utilized in practicing the invention are polymers of unsaturated nitriles represented by the formula

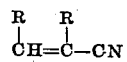

wherein each R is a member of the class consisting of hydrogen, an alkyl group, and an aryl group. The alkyl group can be such particular groups, for example, as methyl, ethyl, propyl, isopropyl, butyl, pentyl, octyl, decyl, etc., while the aryl group can be such groups as phenyl, tolyl, xylyl, ethyl phenyl, tertiary butyl phenyl, naphthyl, methylnaphthyl, etc. The unsaturated nitriles can have any combination of particular groups falling within the above-indicated formula. By the method of the invention, polymers thereof can be converted to the corresponding amines.

It is desirable to effect the hydrogenation of the polymeric unsaturated nitriles by treating a solution of the polymer with hydrogen. However, certain of the polymeric nitriles are, as commonly prepared by well known methods, not soluble as such in solvents ordinarily suitable for use as hydrogenation media. One method which the present invention contemplates for obviating this difficulty is to prepare a polymeric amine containing a multiplicity of amino groups in the macromolecules thereof by employing as polymer to be hydrogenated, a copolymer of the unsaturated nitrile with another copolymerizable compound containing a $CH_2=C<$ group therein. Thus polyacrylonitrile is insoluble in apparently all common organic solvents which are suitable as hydrogenating media. By employing a copolymer from say 30 parts by weight of acrylonitrile with 70 parts of styrene, the copolymer is soluble in benzene owing to the solubilizing influence of the styrene units in the copolymer macromolecule. While hydrogenation of this copolymer does not give a polymeric amine containing as many amino groups per unit weight as does hydrogenating polyacrylonitrile, the product is a highly satisfactory polymeric amine which in fact has modified properties enhancing its value for certain purposes. Thus hydrogenated copolymers of acrylonitrile and styrene have lessened water solubility as compared to hydrogenated polyacrylonitrile, and this property is particularly useful in some applications of the polymer.

The copolymeric amines of the invention are obtained by hydrogenation of copolymers of a nitrile represented by the formula

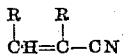

wherein each R is a member of the class consisting of hydrogen, an alkyl group and an aryl group, with at least one other copolymerizable compound containing a $CH_2=C<$ group therein. Representative examples of the copolymerizable compounds containing the vinylidene group therein from which the copolymers are derived include styrene, methyl styrene, vinyl naphthalene, butadiene - 1,3 isoprene, 2,3 - dimethylbutadiene - 1,3, 2-methylpentadiene-2,4, 2-methylpentadiene-1,3, cyclopentadiene, vinyl acetate, diallyl phthalate, methyl methacrylate, methyl acrylate, ethyl acrylate, methyl vinyl ketone, methyl isopropenyl ketone, acrolein, methacrolein, and the like. Methods of effecting the formation of these copolymers are known to the art and will not be described here. It may be stated, however, that the proportion of solubilizing compound employed is such that soluble forms of the copolymers are obtained when it is desired to hydrogenate the copolymers in solution. The proportion of course will vary and depend upon the particular nitrile and other copolymerizable compounds but is easily determined by trial with copolymers from varying proportions of the same components. In general, aromatic hydrocarbons are preferred as solvents for this purpose and for use in effecting the hydrogenation. Examples of these preferred solvents include benzene, toluene, xylenes, ethylbenzene, cumene, tertiary butyl benzene, and the like.

In view of the limited solubilities of many of the polymeric starting materials, the difficulty of obtaining a soluble form thereof, and the marked tendency of the polymeric nitriles to decompose if attempts to liquefy or fuse them by heating is made, it is preferred to execute the process of the present invention by a different mode of procedure. According to this procedure, an aqueous dispersion of the polymeric nitrile is subjected to hydrogenation so as to produce the desired polymeric amine. The polymeric nitriles are conveniently obtained, as is well known, by effecting the polymerization thereof in an aqueous dispersion. This dispersion is then taken and the nitrile therein reduced to the polymeric amine by treatment with hydrogen. In this manner, the difficulty from insolubility of the polymers is obviated and all types of the polymeric and copolymeric nitriles hereinbefore described can be converted to the products of the invention.

In practicing the invention, an aqueous dispersion of polymeric nitrile is first prepared. Into a glass container are placed 7 parts of Turkey red oil, 300 parts of distilled water, 0.7 part of benzoyl peroxide, and 100 parts of freshly distilled methacrylonitrile in the order named. The glass container is closed with a seal lined with aluminum foil and is revolved in a water bath heated at about 60° C. for about 30 hours. A stable latex of polymethacrylonitrile is obtained. The peroxide polymerization catalyst is destroyed by adding about one part of a 10% aqueous solution of hydrazine. The dispersion is then transferred to a high pressure autoclave fitted with a stirrer and 5 parts of Raney nickel (see U. S. Patent No. 1,628,190) is added thereto along with 30 parts of concentrated aqueous ammonia. The contents of the autoclave are then heated, with rapid stirring, at 135° C. to 145° C. while maintaining a pressure of about 750 pounds per square inch with hydrogen. The treatment is continued until absorption of hydrogen ceases. The aqueous product is then boiled to remove ammonia. A portion of the polymer is insoluble in the solution and is removed by filtration along with the nickel catalyst. The filtrate is evaporated and a good yield of hydrogenated polymethacrylonitrile or polymethallyl primary amine is obtained.

The dispersions of the polymeric nitriles are prepared using the usual emulsifying agents such as soap, sodium, potassium or ammonium, oleates, stearates or palmitates, Turkey red oil, Marseilles soap, Ivory soap, Castile soap, alkylated naphthalene sulfonic sodium salts, palmitic sulfonic salts, triethanolamine stearate, sodium lauryl sulfate and the like. Various polymerization catalysts are used such as benzoyl peroxide, lauryl peroxide, succinyl peroxide, hydrogen peroxide, tertiary butyl hydroperoxide, sodium or potassium persalts like persulfate, percarbonate, perborate and the like.

Any of the well known hydrogenation catalysts can be used in the process, such as metallic nickel, colloidal platinum, finely divided palladium, copper chromite, as well as comminuted or flocculated oxides or sulfides of chromium, tungsten or molybdenum. The latter group of catalysts, e. g. the metallic sulfides or oxides, are particularly useful in that they are resistant to poisoning. However, they lack the high activity possessed by Raney nickel, which is the preferred catalyst. Another particularly suitable catalyst is prepared by heating nickel formate until decomposed in a high boiling mineral oil and then reducing it with hydrogen. The activated nickel is concentrated by settling and decanting the oil therefrom, care being taken to keep air from it by blanketing with hydrogen.

Since the dispersions of either the polymeric nitriles or copolymeric nitriles contain polymerization catalysts like the above indicated peroxides or persalts which cause some of the hydrogenation catalysts to lose their activity, the polymerization catalysts are ordinarily destroyed prior to subjecting the dispersions to the hydrogenation treatment. This is particularly necessary when a nickel hydrogenation catalyst is used. This can be done in various ways. Addition of an aqueous solution of hydrazine is particularly preferred although hydroxylamine or its salts, e. g. hydroxylamine hydrochloride, or salts of hydrazine, e. g. hydrazine dihydrochloride, are also suitable. With sulfur-resistant hydrogenation catalysts like molybdenum oxide or sulfide, sodium hydrosulfite can be added to destroy the polymerization catalyst. Manganese oxide is another suitable material which can be added to destroy the polymerization catalyst. Hydrogen is also suitable and is utilized by adding used nickel catalyst which is comparatively inactive to the aqueous dispersion after which the mixture is heated and subjected to hydrogen pressure until the polymerization catalyst is destroyed or had the active oxygen thereof taken up. Instead of used nickel catalyst, molybdenum oxide or sulfide can be employed in this polymerization catalyst destroying treatment after which the highly active nickel catalyst is added and the hydrogenation proper is effected.

While the use of about 5% of hydrogenation catalyst based on the weight of polymer is preferred, larger or smaller proportions can be used if desired such as from 1% to 10% or, in some cases with catalysts of lesser activity, 40% to 50% is used.

The hydrogenation is preferably effected with the dispersion of the polymer in an aqueous medium, but any suitable liquid media can be used if desired. Thus, the hydrogenation can be effected using such substances for liquid media as glycerol, ethylene or propylene glycol, isopropyl alcohol and the like. In general, however, water is very satisfactory and its cheapness ordinarily precludes use of other materials for this purpose.

The hydrogenation is effected at about 50° C. to 250° C. Temperatures appreciably higher than the upper limit of this range are to be avoided since the polymeric nitriles tend to decompose at such temperatures. Preferably, a temperature of 125° C. to 175° C. is used. Hydrogen pressures of 50 to 1000 pounds per square inch or higher, if desired, are used. Vigorous agitation of the dispersion is desirable in accomplishing the desired hydrogenation of the polymer.

Effecting the hydrogenation in the presence of ammonia is advantageous since the ammonia tends to supress the formation of other groups than primary amino groups from the nitrile groups in the polymers. When no ammonia is present the hydrogenation treatment causes formation apparently of some secondary amino groups, possibly tertiary amino groups. These result in a cross-linked polymer rather than a linear polymer which is usually desirable. The presence of ammonia tends to markedly supress such side reactions in the hydrogenation treatment. The use of about 10% to 20% of ammonia per unit weight of polymeric nitriles is preferred although larger proportions can be used if desired. The ammonia is conveniently added as aqueous ammonia when an aqueous dispersion of polymeric nitrile is hydrogenated. Anhydrous ammonia can be used when non-aqueous media are used, or it can be added along with the hydrogen gas, i. e. as a mixture of hydrogen and ammonia.

The polymeric nitriles, as is known, tend to hydrolyze rather easily when in contact with strong acidic or basic media and such media are to be avoided in producing the polymeric amines. As a rule, the aqueous dispersions obtained by emulsion polymerization of the nitrile are satisfactory and are not too basic. In general, to avoid hydrolysis, it is desired to effect the hydrogenation within a pH range of between about 5.5 and 8.5 and it is particularly useful to have the reaction media slightly basic in using Raney nickel, the preferred catalyst.

What has been stated hereinbefore with particular reference to hydrogenation of dispersions of the polymeric nitrile in describing the catalysts, amounts of catalyst, temperature, pressures, use of ammonia, and the like, is equally applicable to hydrogenation of solutions of polymeric nitriles. Thus, a benzene solution containing about 15% by weight of a copolymer from 80 parts of styrene and 20 parts of acrylonitrile is hydrogenated. The liquid solution is placed in an autoclave along with 5% of Raney nickel based on the weight of copolymer and ammonia gas is forced in, to an amount of about 15% by weight of the polymer. The contents of the autoclave are then heated and maintained at about 155° C. while hydrogen is absorbed therein at a pressure of about 500 pounds per square inch. After the hydrogen absorption has ceased, the contents of the autoclave are removed and the benzene and ammonia evaporated therefrom. The polymer has strong neutralizing power for hydrochloric acid.

In hydrogenating the polymeric nitriles, the combination of the hydrogen probably occurs in stepwise fashion. The polymeric nitrile contains a multiplicity of nitrile groups and the hydrogen, in combining with individual nitrile groups therein, first reduces the group to an imino group and this is followed by reduction of the imino group to an amino group. This is illustrated by the following equation which demonstrates the reactions which occur in hydrogenating a polymer from acrylonitrile.

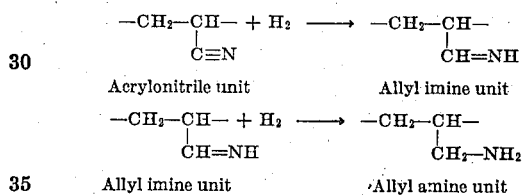

Of course, in hydrogenating the polymeric nitriles, hydrogen does not combine solely in such a manner that all the nitrile groups of a given amount of polymer is first reduced to imino groups and only then are the imino groups reduced to amino groups. When hydrogen is incompletely combined (saturation with hydrogen is incomplete), the polymer contains a mixture of groups and evidences properties showing that it contains some unchanged nitrile groups, some inimo groups and some amino groups. At times this type of polymer is desirable. It is attained by discontinuing the hydrogenation before saturation of the polymer with hydrogen is accomplished as by releasing the hydrogen pressure, reducing the temperature to normal temperature (atmospheric temperature) or both. In the claims to the present application such terms as "hydrogenated polyacrylonitrile" and like terms are meant to designate the class of products obtained wherein hydrogen has combined to the maximum or to a lesser degree with a particular polymer and such terms are thus generic to the more restricted though more preferred substances like polyallyl amine and like materials containing the nitrogen therein solely as amino groups. This class of products of the invention are polymers of a compound represented by the formula

wherein each R is a member of the class consisting of hydrogen, an alkyl group and an aryl group. Particular examples of the last-named groups have been given hereinbefore.

The hydrogenation of certain copolymeric nitriles is also of stepwise character. For example, the copolymer of acrylonitrile and styrene or acrylonitrile and butadiene-1,3 each have unsaturated units in the macromolecule thereof other than acrylonitrile units. Thus the acrylonitrile-styrene copolymer contains phenyl groups linked to the polymer chain thereof which are unsaturated. In general, such unsaturated groups are more difficult to reduce or saturate than is the case of the nitrile groups. However, by raising the temperature from 20° C. to 30° C. after reduction of the nitrile groups to amino groups has been completed and continuing the hydrogenation, complete saturation of the polymer is attained. It may also be noted that the hydrocarbon chain of the polymers which are solely from an unsaturated nitrile may not be completely saturated or will contain a small residual unsaturation. In this case, likewise, increasing the temperature after the primary absorption of hydrogen has taken place will completely saturate the polymer.

The polymeric amines produced by hydrogenating the polymeric nitriles have the amino groups thereof linked directly to primary carbon atoms. It is sometimes desired to have a polymer product in which the amino groups are directly linked to secondary carbon atoms. Such products of the invention are prepared by either reacting the polymer of an unsaturated ketone with ammonia so as to first obtain an imine which is subsequently hydrogenated or to react the polymer simultaneously with ammonia and hydrogen. The materials treated according to this procedure are polymers of the class of alpha, beta-unsaturated ketones such as, for example, methyl vinyl ketone, methyl isopropenyl ketone, ethyl vinyl ketone, isopropyl isopropenyl ketone, phenyl vinyl ketone, phenyl isopropenyl ketone, methyl propenyl ketone, and the like. Furthermore, reacting polymers of beta, gamma-unsaturated aldehydes with ammonia and hydrogen gives polymeric amines wherein the amino groups are linked directly to primary carbon atoms as is the case when the polymeric nitriles are hydrogenated. Representative compounds of this type include acrolein, methacrolein, ethacrolein, crotylaldehyde, cinnamylaldehyde, and the like. This class of materials from which the polymeric nitriles of the invention are obtained are polymers of a compound represented by the formula

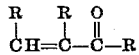

wherein each R represents a member of the class consisting of hydrogen, an alpha group and an aryl group, particular members of the latter groups having been described hereinbefore. If desired, copolymers of the alpha-beta-unsaturated ketones are aldehydes with other copolymerizable compounds containing a CH₂=C< group such as styrene, methylstyrene, vinylnaphthalene, butadiene-1,3, 2,3-dimethylbutadiene-1,3, 2-methylpentadiene-2,4, 2-methylpentadiene-1,3, cyclopentene, vinyl acetate, diallyl phthalate, methyl methacrylate, methyl acrylate and the like can be used.

The reaction of the polymeric alpha,beta-unsaturated ketones or aldehydes is preferably effected with the polymer in solution. Normally liquid aromatic hydrocarbons are preferred solvents for this purpose and include benzene, toluene, xylene, ethylbenzene, cumene, tertiary butyl benzene or mixtures thereof and the like. The hydrogenation catalysts described hereinbefore are effective catalysts for obtaining the reaction of the polymers with ammonia and hydrogen. The amount of ammonia employed, preferably in anhydrous state, is in molecular excess to the equivalent amount of carbonyl content of the polymer, i. e. it is in excess of that amount of ammonia needed to combine with all the carbonyl groups in a given quantity of polymer; thus one mole of ammonia is needed for each equivalent of carbonyl in the polymer. Preferably, the proportion of ammonia is such that there are two moles of ammonia for each carbonylic equivalent of polymer.

The reaction is preferably effected by mixing a solution of polymer with anhydrous ammonia and, after adding the hydrogenation catalyst, to heat the reaction mixture under pressure with hydrogen. The temperature can be varied considerably, but from about 75° C. to 250° C. is suitable, while using 50 to 1000 pounds per square inch or higher of hydrogen pressure. The amount of hydrogenation catalyst is preferably about 5% by weight of the polymer treated, although it can vary from about 1% to 10% if desired.

In practicing this mode of procedure of the invention, a solution of 100 parts of polymeric methyl isopropenyl ketone in 500 parts of benzene is placed in a pressure autoclave. About 5 parts of Raney nickel is added along with 40 parts of anhydrous ammonia. The contents of the autoclave are agitated and heated at 140° C. to 150° C. under a hydrogen pressure of about 500 pounds per square inch. When absorption of hydrogen ceases, the contents of the autoclave are cooled and hydrogen and unreacted ammonia are vented therefrom, evaporation of the volatile material gives a product which neutralizes dilute hydrochloric and sulfuric acids.

The polymeric amine products of the invention have macromolecules which contain a plurality of units represented by the structure

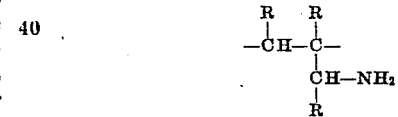

wherein each R is a member of the class consisting of hydrogen, an alkyl group and an aryl group. Specific examples of the groups have been given hereinbefore. Each of the polymers contains this characteristic and essential unit in the macromolecules thereof whether derived from a sole polymer of the unsaturated nitriles or from a copolymer thereof as well as from polymers of the unsaturated ketones or from copolymers thereof. Thus, the polymeric amines from acrylonitrile or a copolymer thereof, as well as from acrolein or a copolymer thereof contain in the macromolecule a plurality of units represented by the formula

In the polymers of the invention the macromolecules have a carbon chain consisting solely of directly interlinked carbon atoms, to which carbon atoms are linked, side chains having the amino groups linked thereto and in all cases except polymer from the lowest compound, e. g. from acrylonitrile, other substituent groups. Thus the polymeric amine from methacrylonitrile has plurality of methyl groups linked to the carbon chain. In all cases each amino group is separated from the carbon atoms in the carbon chain by an intervening saturated aliphatic carbon atom.

As used in the specification and the annexed, the prefix "poly" is meant to designate a polymer of the main substances. Thus the term "polyallyl primary amine" designates the polymer of allyl primary amine wherein a multiplicity of allyl amine molecules or units are joined in the polymer molecules by carbon-to-carbon linkages.

The polymeric amines of the invention are versatile and useful materials. The lower members such as polyallyl primary amines are soluble in water and aqueous solutions thereof are useful for scrubbing acidic components like $H_2S$ and $CO_2$ from gases. Since the polymeric amines are non-volatile, no loss of amines by volatilization is encountered in their use for gas scrubbing and this is of great economic value. The used solutions may be regenerated by steaming. Such solutions can also be used to extract mercaptans and other acid compounds from gasoline, pressure distillate and other hydrocarbon oils. The low molecular weight polymers of polyallyl amine are liquid at normal temperatures and they are likewise useful for extracting acid components from materials containing them. Thus, the refining of vegetable oils can be accomplished by contacting the oils with the polymeric amines. Amide resins can be prepared by reacting the polymeric amines with either mono or polycarboxylic acids. Amide products such as polyallyl acetamide or polyallyl trichloracetamide may be used as insecticides. The polymeric amines are also useful polymerization inhibitors and their non-volatility makes them particularly suitable since they are easily and completely removed from a polymerizable monomer containing them, such as styrene or vinyl chloride, by simple distillation or evaporation of the monomer. Nitrite salts of such polymeric amines as polymethylvinyl carbinol amine are useful as corrosion inhibitors of metals such as iron and steel. Salts can be prepared by only partial neutralization with nitrous acid and aqueous solutions of them have the required basicity at which their corrosion inhibition is most effective. Polymeric amines are also particularly useful as anion exchange resins in that they have a high content of amino groups. For use as anion exchange resins, it is essential that the polymers be insoluble in the material being treated whether such material be of aqueous character or non-aqueous such as gasoline. An insoluble polymer of three dimensional type is prepared by reacting the polymeric amines with only a small proportion of a compound containing a multiplicity of halogen atoms such as ethylene dichloride. This gives a polymer having bridges therein rather than being solely linear in character and the polymer is of an insoluble type. Some of the copolymeric amines of the invention, such as hydrogenated copolymers of butadiene and acrylonitrile, inherently have this property of insolubility.

I claim as my invention:

1. The product obtained by hydrogenating the homopolymer having a degree of polymerization of at least four of a compound of the formula

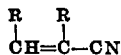

wherein each R is a member of the class consisting of hydrogen, an alkyl group and a mononuclear aryl group, said groups containing only hydrogen and carbon, and all the nitrogen in said product being present in amino groups.

2. The product obtained by hydrogenating the homopolymer of acrylonitrile having a degree of polymerization of at least four, all the nitrogen contained in said product being present as amino groups.

3. The product obtained by hydrogenating the homopolymer of methacrylonitrile, all the nitrogen contained in said product being present as amino groups which are at least four in number.

4. A process for the production of a hydrogenated product which comprises subjecting a polymer of a nitrile present as a dispersion in an aqueous medium to the action of hydrogen under hydrogenating conditions, said nitrile being a compound of the formula

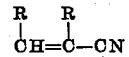

wherein each R is a member of the class consisting of hydrogen, an alkyl group and a mononuclear aryl group, said groups containing only hydrogen and carbon, and said hydrogenation being effected after destroying any peroxide present in said dispersion.

5. A process for the production of a hydrogenated product which comprises subjecting a polymer of acrylonitrile present as a dispersion in an aqueous medium to the action of hydrogen under hydrogenating conditions after destroying any peroxide present in said dispersion of polymer.

6. A process for the production of a hydrogenated product which comprises heating an aqueous dispersion of a polymeric acrylonitrile at 250° C. under a hydrogen pressure of 50 to 1,000 pounds per square inch in the presence of a hydrogenation catalyst and added ammonia, said hydrogenation treatment being effected after destroying any peroxide present in said dispersion of polymer.

7. A process for the production of a hydrogenated product which comprises heating an aqueous dispersion of homopolymeric acrylonitrile at 250° C. under a hydrogen pressure of 50 to 1,000 pounds per square inch in the presence of a hydrogenation catalyst and added ammonia, said hydrogenation treatment being effected after destroying any peroxide present in said dispersion of polymer.

8. A process for the production of hydrogenated product which comprises heating an aqueous dispersion of homopolymeric acrylonitrile at 125° C. to 175° C. under a hydrogen pressure of 50 to 1,000 pounds per square inch in the presence of a nickel hydrogenation catalyst and added ammonia while maintaining the aqueous dispersion at a pH of 5.5 to 8.5 said hydrogenation being effected after destroying any peroxide present in said dispersion of polymer.

JAMES H. PARKER.

REFERENCES CITED

The following references are of record in the file of this patent:

UNITED STATES PATENTS

| Number | Name | Date |
| --- | --- | --- |
| 1,984,417 | Mark et al. | Dec. 18, 1934 |
| 2,136,177 | Carothers | Nov. 8, 1938 |
| 2,166,150 | Howk | July 18, 1939 |
| 2,198,936 | Frey et al. | Apr. 30, 1940 |